Aug. 7, 1956     E. D. CLIFFORD ET AL     2,757,595
QUICK ATTACHMENT SWEEP
Filed Sept. 24, 1953
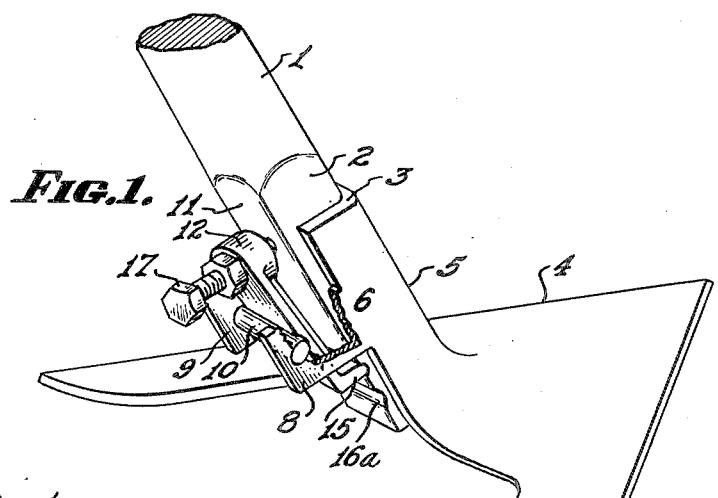
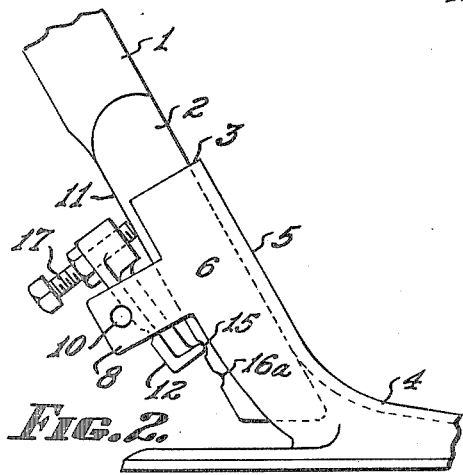
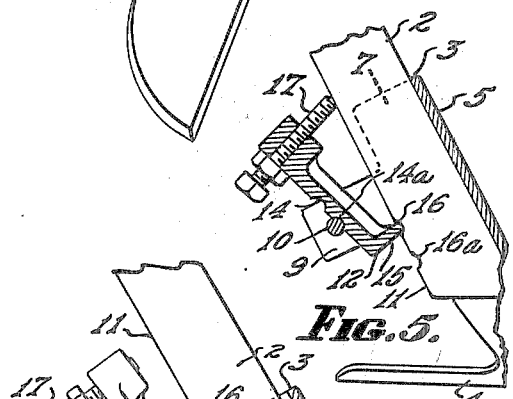
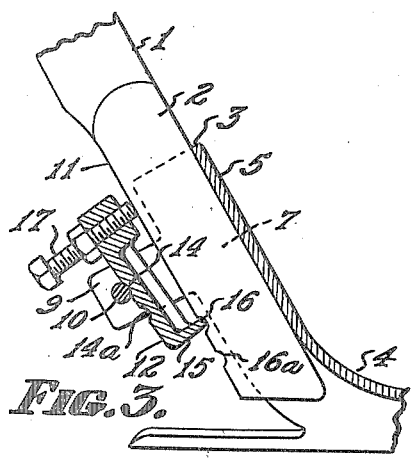
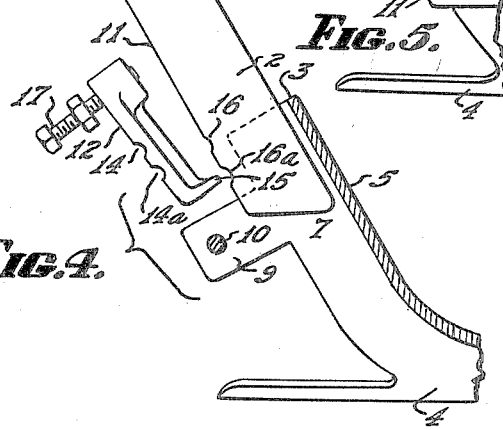
INVENTORS.
EMMA D. CLIFFORD
AND JAMES A. POLLACK,
BY
*Allen & Allen*
ATTORNEYS.

United States Patent Office 2,757,595
Patented Aug. 7, 1956

2,757,595

QUICK ATTACHMENT SWEEP

Emma D. Clifford, Leesburg, and James A. Pollock, Albany, Ga.

Application September 24, 1953, Serial No. 382,088

1 Claim. (Cl. 97—198)

Our invention relates to cultivators, and more particularly to cultivating tools which may be quickly and easily attached to and detached from the cultivator.

It is a principal object of our invention to provide a detachable cultivating tool assembly comprising essentially a shank member adapted to be secured to the cultivator frame, the lower end of the shank being of reduced width defining a tongue adapted to be received in a socket carried by the cultivating tool or headpiece, the socket having rearwardly extending arms or flanges carrying a transversely disposed pin which acts as a fulcrum for a locking arm disposed between the said pin and the tongue of said shank and adapted to bear against the shank, the locking arm being provided at one end with a set screw by means of which the opposite end thereof is brought into clamping engagement with the shank.

It is a further object of our invention to provide a device of the character described which is extremely simple in construction and yet sufficiently rugged to withstand hard usage.

It is a still further object of our invention to provide a cultivating tool attachment having simplified locking means by means of which the attachment may be secured to a shank supported by the cultivator frame, the parts being so arranged that the tool may be quickly and easily adjusted axially of the supporting shank.

These and other objects of our invention which will appear hereinafter or which will be apparent to the skilled worker in the art upon reading these specifications, we accomplish by that construction and arrangement of parts of which we shall now describe certain exemplary embodiments.

Reference is now made to the accompanying drawings wherein:

Figure 1 is a perspective view with parts broken away showing our invention applied to a cultivating tool in the form of a sweep.

Figure 2 is a side elevational view of the device illustrated in Figure 1.

Figure 3 is a vertical sectional view of the device in the position illustrated in Figure 2.

Figure 4 is a side elevational view similar to Figures 2 and 3 but with the parts in exploded relation.

Figure 5 is a parital side elevational view of the device illustrated in Figure 4 in an alternate position of the locking arm.

In a conventional cultivator, the main frame of the device supports a plurality of generally vertically disposed, spaced apart shank members to the lower end of which are bolted or otherwise secured various cultivating tools or headpieces. In many instances bolts or pins were passed through both the headpiece and the shank to fixedly secure them together; and the changing or adjustment of the individual headpieces required considerable time and effort. We have overcome these difficulties by means of a construction in which the headpieces may be quickly and easily attached to or detached from their shanks, as well as quickly and easily adjusted axially of the supporting shanks.

As seen in Figure 1 of the drawings, the shank 1 which, as will be understood, is supported from the cultivator frame, is provided at its lower end with a tongue portion 2 which is of a size to be received in the socket 3 of the headpiece 4, which is, in this instance, a sweep; although it will be evident that other forms or types of headpieces may be employed. The tongue portion 2 will be preferably rectangular in cross-section, and the socket 3 will have a front portion 5 and opposed side portions 6 and 7 dimensioned to receive the corresponding surfaces of the tongue 2.

The rear portion of the socket 3 is open, and flanges 8 and 9 extend rearwardly from the opposite side portions of the socket 3 in the manner illustrated, and a transversely disposed pin 10 extends between the flanges 8 and 9, the pin being spaced outwardly, i. e., rearwardly, from the rear surface 11 of the tongue 2.

The headpiece is secured to the shank by means of the locking arm 12 which is fitted between the pin 10 and the rear surface 11 of tongue portion 2 of the shank 1. The locking arm has an elongated body having a plurality of transverse notches, such as 14 and 14a, extending transversely thereof and adapted to contact the pin 10 in the manner illustrated. The lower end of the arm is provided with an inturned finger 15 adapted to selectively contact the transverse notches 16 and 16a in the rear surface 11 of the tongue portion 2. At its upper end, the locking arm carries a set screw 17 which passes through the upper end of the locking arm and makes contact with the rear surface 11 of the tongue portion 2.

In the operation of our device, the tongue portion of the shank will be fitted into the socket of the headpiece and the locking arm fitted between the tongue portion and the pin 10. The relationship of the parts will be such that the locking arm may be inserted in the space between the rear surface 11 of the tongue portion 2 and the pin 10 when the set screw 17 is backed-off so as to not project forwardly of the locking arm. The initial condition of the parts is illustrated in Figure 4.

After the locking arm has been fitted in place and the desired notch 14, for example, brought into contact with the pin 10, as illustrated in Figures 2 and 3, the finger 15 will be contacted with the desired notch 16 in the rear surface of the tongue portion 2. The set screw 17 is then tightened to securely clamp the headpiece to the shank. It will be evident that as the set screw 17 is tightened and the upper end of the locking arm body 12 moved outwardly, the body will pivot about the pin 10—which acts as a fulcrum—thereby causing the finger 15 to move forwardly into tight engagement with the notch 16. It will also be evident that the clamping arm forces the tongue portion 2 into tight contact with the front wall portion 5 of the socket 3; and that axial movement of the shank relative to the socket is prevented by engagement of the finger 15 in notch 16. Similarly, the engagement of the notch 14 with the pin 10 prevents axial movement of the locking arm.

As illustrated in Figure 5, the headpiece 4 may be adjusted axially of the shank, thereby controlling the depth of cut of the sweep 4, for example, by engaging the notch 14a with the pin 10, as shown, and/or by contacting the finger 15 with the notch 16a instead of notch 16. In this connection, it will be understood that the number of notches in the clamping arm and in the tongue portion of the shank may be varied as found practicable. It will be evident, also, that the locking arm acts as a lever, the effective length of which may be varied depending upon which of the notches in the clamping arm is contacted with the pin 10.

Modifications may, of course, be made in our invention without departing from the spirit of it. For example, while we have illustrated our invention as it will apply to a cultivator sweep, it will be understood that the attachment assembly disclosed will find utility elsewhere wherein it is desired to fixedly and yet adjustably secure a headpiece to a supporting shank.

Having thus described our invention in an exemplary embodiment, what we desire to protect and secure by Letters Patent is:

In combination with a shank member secured to a cultivator and having a lower end of reduced width defining a tongue, a cultivating tool having an integrally formed socket of a size to receive the tongue portion of said shank, said socket consisting of smooth, uninterrupted front and side walls, spaced apart flanges extending rearwardly from the sides of said socket, a pin extending between said flanges, a locking arm between said shank and said pin, a plurality of spaced apart notches extending along said locking arm selectively engageable with said pin to fulcrum said locking arm on said pin, a set screw extending through one end of said locking arm and operative against said shank to pivot the locking arm about said pin and thereby bring the opposite end of said locking arm into clamping engagement with said shank, an inwardly directed projection on the opposite end of said locking arm selectively engageable in a plurality of spaced apart notches extending along the rear face of the tongue portion of said shank.

References Cited in the file of this patent

UNITED STATES PATENTS

| | | |
|---|---|---|
| 438,347 | Dickerman | Oct. 14, 1890 |
| 694,351 | Chappel | Mar. 4, 1902 |
| 718,041 | Willbanks et al. | Jan. 6, 1903 |
| 908,256 | Harrison | Dec. 29, 1908 |
| 1,045,048 | Logan et al. | Nov. 19, 1912 |
| 1,250,472 | Kirkpatrick et al. | Dec. 18, 1917 |
| 1,476,551 | Strandlund | Dec. 4, 1923 |
| 1,996,666 | Berggren | Apr. 2, 1935 |
| 2,144,140 | Batcheller | Jan. 17, 1939 |